United States Patent [19]

Maehata et al.

[11] Patent Number: 4,969,695
[45] Date of Patent: Nov. 13, 1990

[54] DETECTION OF ABNORMALITY FOR ROTATIONAL SPEED SENSOR

[75] Inventors: Hiromi Maehata; Yutaka Okuda, both of Kariya; Syouichi Masaki, Anjo; Satoshi Hirano, Nagoya; Ken Asami, Nagoya; Kazunori Sakai, Nagoya, all of Japan

[73] Assignees: Nippondenso Co., Ltd., Kariya; Toyota Jidosha Kabushiki Kaisha, Toyota, both of Japan

[21] Appl. No.: 180,629

[22] Filed: Apr. 6, 1988

Related U.S. Application Data

[63] Continuation of Ser. No. 831,794, Feb. 21, 1986, abandoned.

[30] Foreign Application Priority Data

Feb. 25, 1985 [JP] Japan .................. 60-36028

[51] Int. Cl.⁵ .............................. G01R 33/02
[52] U.S. Cl. ........................ 303/92; 324/166
[58] Field of Search ............. 303/92; 364/565, 426, 364/426.01, 426.02; 324/161, 166, 173, 174, 167; 340/670, 671, 672; 73/121, 2

[56] References Cited

U.S. PATENT DOCUMENTS

| | | | |
|---|---|---|---|
| 3,757,167 | 9/1973 | Yoshikawa | 324/166 |
| 3,935,537 | 1/1976 | Batchelor | 324/166 |
| 4,092,853 | 6/1978 | Schneider et al. | 303/92 |
| 4,361,871 | 11/1982 | Miller et al. | 303/92 |
| 4,836,616 | 7/1989 | Roper et al. | 303/92 |

FOREIGN PATENT DOCUMENTS

| | | | |
|---|---|---|---|
| 2425361 | 12/1979 | France. | |
| 0210369 | 11/1984 | Japan | 324/166 |
| 0210371 | 11/1984 | Japan | 324/166 |
| 0210374 | 11/1984 | Japan | 324/166 |
| 60-190866 | 9/1985 | Japan. | |
| 2045950 | 11/1980 | United Kingdom. | |
| 2020496 | 7/1982 | United Kingdom. | |

Primary Examiner—Alvin Oberley
Attorney, Agent, or Firm—Cushman, Darby & Cushman

[57] ABSTRACT

In an apparatus for detecting the abnormality of a rotational speed sensor adapted for, for example, an antiskid control system, a time period within which a subsequent pulse will be generated by the rotational speed sensor in response to the rotation of a body of revolution such as wheel is estimated on the basis of the latest pulse interval of the pulses previously generated therefrom and a value corresponding to the force of inertia of the wheel developed on the braking operation thereof. The determination of abnormality of the rotational speed sensor is made when the subsequent pulse is not produced within the estimated time period. This is arranged based on the fact that the pulse interval depends upon the inertial force of the wheel. With the above arrangement, the abnormality detection of the speed sensor can be quickly made, so that a fail-safe control in a braking system can be speedily performed in response to the occurrence of abnormality of the speed sensor.

16 Claims, 6 Drawing Sheets

FIG. 7
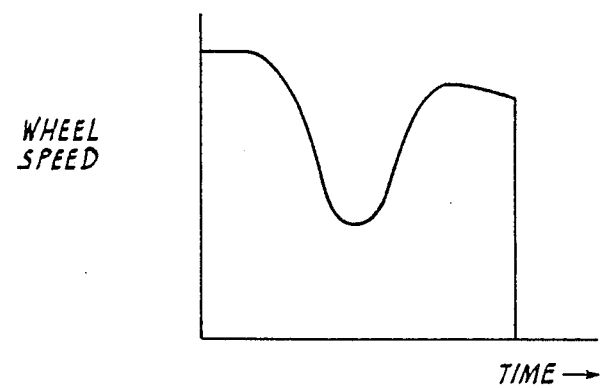
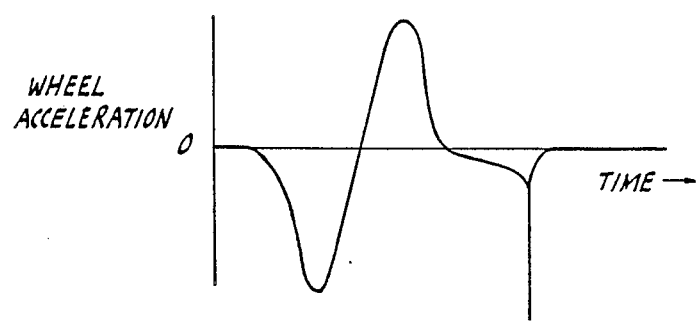
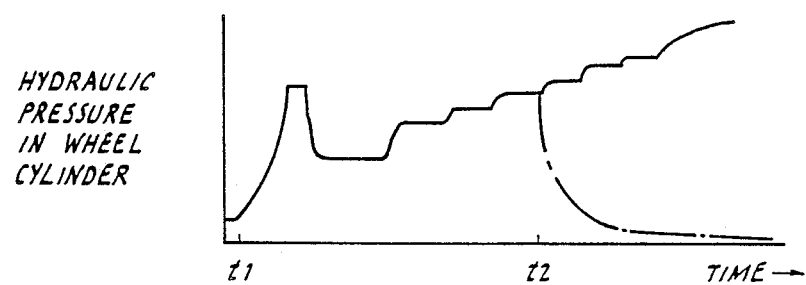

DETECTION OF ABNORMALITY FOR ROTATIONAL SPEED SENSOR

This is a continuation of application Ser. No. 831,794, filed Feb. 21, 1986, which was abandoned upon the filing hereof.

BACKGROUND OF THE INVENTION

The present invention relates to an apparatus for detecting an abnormality occurring in a rotational speed sensor, and is applicable particularly, but not exclusively, to an anti-skid control system.

Generally, anti-skid control systems for use in a vehicle to control the braking hydraulic pressure on the basis of a detection signal obtained by a wheel speed sensor, with a view to maximizing the braking efficiency.

Since failures of the wheel speed sensor result in difficulty in maintaining the appropriate anti-skid control operation, the execution of a fail-safe control would be required in response to the failures because of the necessity to ensure the vehicle braking operation. Therefore, various systems have hitherto been proposed for the detection of abnormality of the wheel speed sensor. One example of such systems is disclosed in Japanese Patent Provisional Publication No. 58-61052, the technique of which involves differentiating the detection signal from the wheel speed sensor and detecting a temporarily occurring abnormality by comparing the differentiated value with a reference value.

However, such a prior art system would suffer the problems in that the circuit arrangement is complex because the detection signal from the wheel speed sensor is differentiated after converted into an analog signal and difficulty is encountered to quickly detect the abnormality because of the requirement of considerable processing time.

SUMMARY OF THE INVENTION

It is therefore an object of the present invention to provide a new and improved system for detecting the abnormality of a rotational speed sensor which overcomes the disadvantages inherent in the prior art system.

More specifically, the present invention provides an abnormality detection system having a simple arrangement which is capable of quickly detecting the failures of the speed sensor so that, for example, a fail-safe control in a braking system can speedily be effected with a view to providing a more safer braking action.

A feature of the present invention is that a time period is estimated within which a subsequent signal should be generated by a rotational speed sensor in response to the rotation of a body of revolution such as a wheel. A detection of abnormality of the sensor is made when the subsequent signal is not produced within the estimated time period. This time period is estimated on the basis of the latest signal interval of the signals previously obtained therefrom and a value corresponding to the force of inertia of the wheel developed on the braking operation thereof. This is based on the fact that the signal interval depends upon the inertial force of the wheel and the time period is appropriately estimated under varying wheel drive conditions. The value corresponding to the inertial force can be obtained from the the rate of variation of the wheel speed. It is also appropriate that the value is determined in advance and used as a constant.

In accordance with the present invention, there is provided an apparatus for detecting the abnormality of a rotational speed sensor employed for sensing a rotational speed of a body of revolution, comprising: means responsive to a signal from the rotational speed sensor for measuring an interval between the successive signals therefrom; means for estimating a time period within which a subsequent signal is generated by the rotational speed sensor from the previously measured interval; and means for determining the abnormality of the rotational sensor when the signal is not generated within the estimated time period.

In accordance with the present invention, there is also provided an apparatus for detecting the abnormality of a rotational speed sensor employed for sensing a rotational speed of a body of revolution, comprising: means responsive to a signal from the rotational speed sensor for measuring an interval between the successive signals therefrom; means for obtaining a time period within which a subsequent signal is generated by the rotational speed sensor by adding a value to the previously measured interval; and means for determining the abnormality of the rotational sensor when said subsequent signal is not generated within the obtained time period.

In accordance with the present invention, there is further provided an apparatus for detecting the abnormality of a rotational speed sensor employed for sensing a rotational speed of a body of revolution, comprising: means responsive to a signal from the rotational speed sensor for measuring an interval between the successive signals therefrom; means for estimating a time period within which a subsequent signal is generated by the rotational speed sensor, on the basis of the previously measured interval and a value indicative of an inertial force of the body of revolution developed on the braking operation thereof; and means for determining the abnormality of the rotational sensor when the subsequent signal is not generated within the estimated time period.

In accordance with the present invention, there is still further provided an apparatus for detecting the abnormality of a rotational speed sensor employed for sensing a rotational speed of a body of revolution, comprising: means responsive to a signal from the rotational speed sensor for measuring an interval between the successive signals therefrom; means for deriving a rotational speed of the body of revolution as a function of the measured interval; means for deriving a value indicative of the force of inertia of the body of revolution developed on the braking operation thereof, on the basis of the variations of the derived rotational speed; means for estimating a time period within which a subsequent signal is generated by the rotational speed sensor, on the basis of the previously measured interval and the derived inertial force indicating value; and means for determining the abnormality of the rotational sensor when the signal is not generated within the estimated time period.

In accordance with the present invention, there is further provided a braking system with an anti-skid control device for a motor vehicle, comprising: a hydraulic pressure generating cylinder operatively coupled to a brake pedal of said motor vehicle; a wheel braking cylinder responsive to a hydraulic pressure generated by the hydraulic pressure generating cylinder for braking a wheel of the motor vehicle, the wheel braking cylinder being coupled through a hydraulic pressure passage, a directional control valve and a hydraulic pressure control device to the hydraulic pressure generating cylinder; sensor means for sensing a speed of the wheel and generating a signal indicative of the sensed wheel speed; comparator means for comparing the sensed wheel speed with a reference value; first control means for generating a first control signal for performing anti-skid control by controlling the hydraulic pressure control device in accordance with the result of the comparison; second control means responsive to the wheel speed signal for detecting an interval between the successive wheel speed signals and estimating a time period within which a subsequent signal is generated by the rotational speed sensor on the basis of the previously measured interval and a value indicative of the magnitude of the inertial force developed on the braking operation of said wheel, the second control means determining the abnormality of the rotational sensor when the subsequent signal is not generated within the estimated time period and generating a second control signal indicative of the abnormality; and third control means for, in response to the second control signal, performing fail-safe control by controlling the directional control valve.

BRIEF DESCRIPTION OF THE DRAWINGS

The object and features of the present invention will become more readily apparent from the following detailed description of the preferred embodiments taken in conjunction with the accompanying drawings in which:

FIG. 7 is a graphic illustration useful for describing the functions of the present invention.

DETAILED DESCRIPTION OF THE INVENTION

Figure 1:
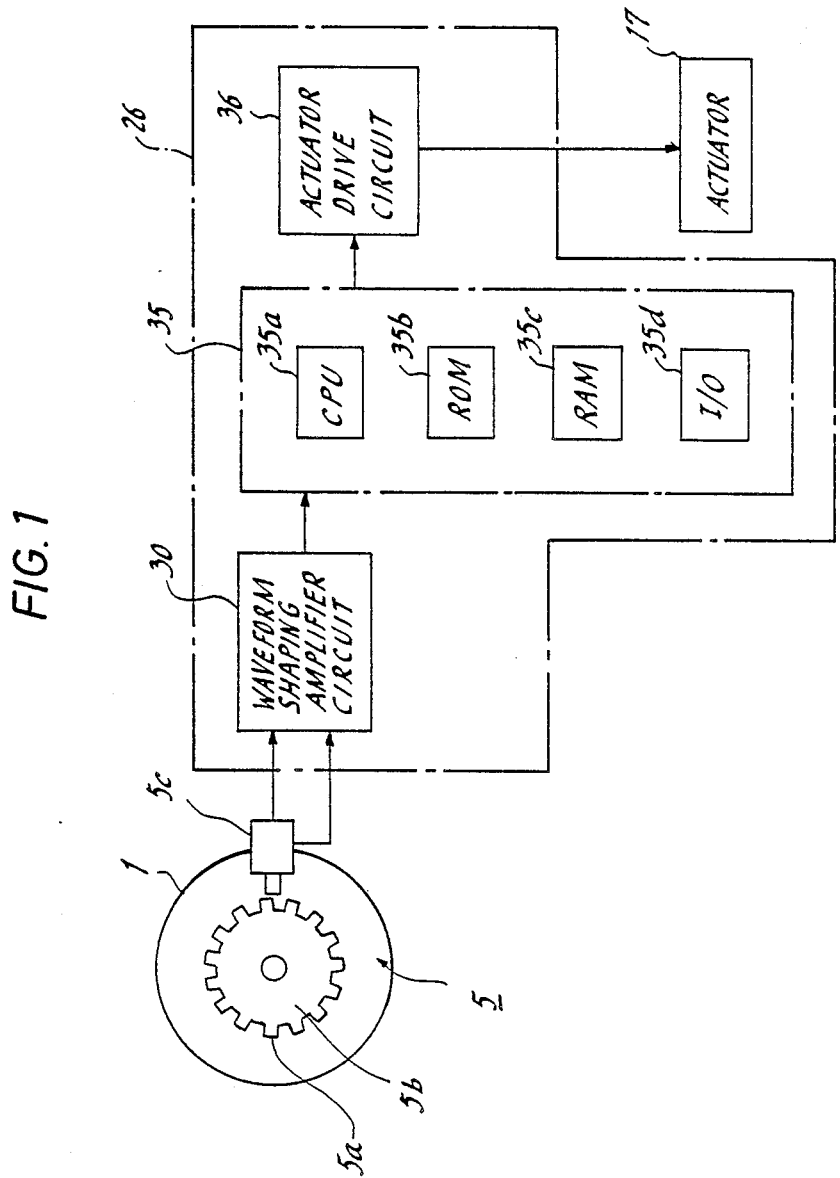
FIG. 1 is a schematic illustration of an actuator drive system, in which control is performed on the basis of an output signal of a rotational speed sensor, incorporating an abnormality detection apparatus according to the present invention.

Referring now to FIG. 1, there is illustrated an abnormality detection system for a rotational speed sensor according to the present invention incorporated in an apparatus for controlling an actuator on the basis of a signal produced by a rotational speed sensor. The actuator control apparatus 26 comprises a control unit 35, a waveform shaping amplifier circuit 30 and an actuator drive circuit 36, and is coupled to a rotational speed sensor 5 comprising a disc-like member 5b having, at the circumference thereof, a plurality of projections 5a which are angularly spaced at equal intervals, and a pick-up device 5c which is associated with the disc-like member 5b to produce a signal corresponding to the rotational speed of the disc-like member 5b. The disc-like member 5b is attached to a body of revolution 1 so that it is rotated together in accordance with the revolution of the body 1. The control unit 35 comprises a microcomputer 35 including a central processing unit (CPU) 35a, a read-only memory (ROM) 35b, a random access memory (RAM) 35c and an input/output port (I/O) 35d. An actuator 17 is controlled through the actuator drive circuit 36 by the control unit 35. The waveform shaping amplifier 30 is responsive to a detection signal from the rotational speed sensor 5 and produces a pulse signal as illustrated in FIG. 2.

Figure 2:
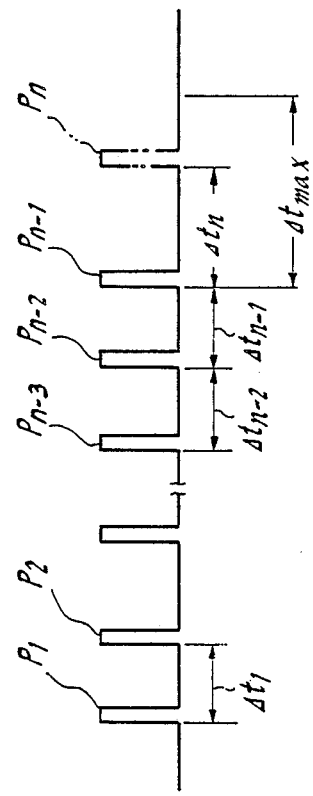
FIG. 2 is an illustration useful for describing the basis of the present invention.

In FIG. 2, pulses of the pulse signal are represented by P1, P2, ... Pn-3, Pn-2, Pn-1, Pn, and the pulse intervals are indicated by $\Delta t_1, \ldots \Delta t_{n-2}, \Delta t_{n-1}, \Delta t_n$. A speed variation will occur in response to the braking operation of the body of revolution 1 and the rate of speed variation G can be calculated on the basis of the pulse intervals. For example, the rate of speed variation G with respect to $\Delta t_{n-1}$ and $\Delta t_n$ is given by the following equation.

$$G = \frac{Vn - Vn - 1}{(\Delta t_{n-1} + \Delta t_n)/2}$$

$$= 2K \frac{\Delta t_{n-1} - \Delta t_n}{\Delta t_{n-1} \cdot \Delta t_n} \times \frac{1}{\Delta t_{n-1} + \Delta t_n}$$

The above equation is written with respect to $\Delta t_n$ as follows.

$$\Delta t_n = -\frac{1}{2}\left(\frac{\Delta t_{n-1}^2 G + 2K}{\Delta t_{n-1} G}\right) + \frac{1}{2}\sqrt{\left(\frac{\Delta t_{n-1}^2 G + 2K}{\Delta t_{n-1} G}\right)^2 + \frac{4 \cdot 2K}{G}} \quad (1)$$

where:

$Vn-1$ = wheel speed obtained on the basis of $\Delta tn - 1$ $Vn$ = wheel speed obtained on the basis of $\Delta tn$ K = constant determined on the basis of the interval of circumferentially spaced projections 5a of the member 5b of the wheel sensor 5, the diameter of the body of revolution 1 and so on.

The rate of speed variation G generally depends upon the force of inertia of the body of revolution 1 developed on braking operation thereof and therefore the rate of speed G represents the magnitude of the inertial force.

Therefore, it will be understood that the following pulse generating point can be estimated in accordance with the above-described equation, i.e., on the basis of the previous pulse interval and the inertial force of the wheel indicated by the rate of speed variation.

When a maximum rate of speed variation which can be obtained with regard to the body of revolution rapidly braked is Gmax (for example, −60 G to −70 G) and $\Delta tn$ obtained at the time is $\Delta t_{max}$, it will be seen from the above equation 1 that $\Delta t_{max}$ can be determined as a function of Gmax and the previous pulse interval $\Delta t_{n-1}$. $\Delta t_{max}$ represents a longest time period within which a subsequent pulse will be generated as long as the rotational speed sensor 5 is in the normal condition. Therefore, if the subsequent signal is not produced up to the time point elapsed by $\Delta t_{max}$ from the time point at which the previous pulse generated, the failure of the sensor 5, such as disconnection or the like, is estimated and the determination of abnormality can be made. Furthermore, according to this abnormality detection method, it is possible to quickly detect the abnormality in accordance with the driving conditions of the body of revolution because $\Delta t_{max}$ is shortened in response to the increase of wheel speed as obvious from the equation 1.

One example of the operation for the determination of abnormality made by the control unit 35 based on the above-noted principle will be described with reference to FIG. 3.

Figure 3:
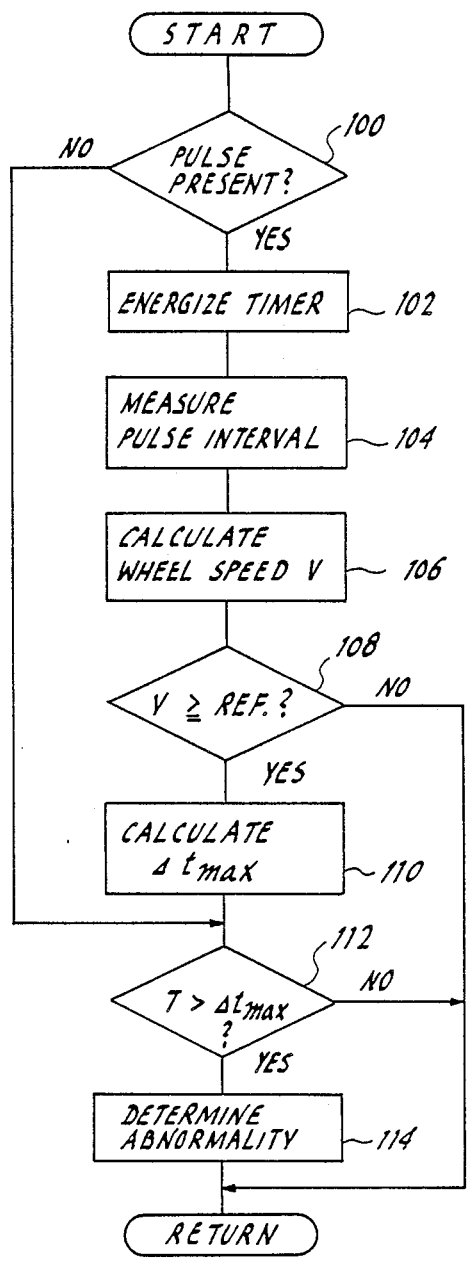
FIG. 3 is a flow chart showing the operation of abnormality detection which is executed by the microcomputer of FIG. 1.

Program shown in FIG. 3, in accordance with instructions stored in the ROM 35b, starts with a block 100 where the CPU 35a checks the presence of the output signal of the rotational speed sensor 5. In response to the presence control advances to a block 102 to initiate the operation of a timer. A subsequent block 104 is successively executed to derive a pulse interval between successive pulses, i.e., the previous pulse and the present pulse and a block 106 follows to calculate the speed V of the body of revolution 1 on the basis of the pulse interval derived in the block 104. Control proceeds to a decision block 108 in which the speed V calculated in the step 106 is compared with a reference value (for example, 30 km/hr) to detect if the rotational speed V is greater than the reference value. If smaller, this routine is terminated because of the prevention of the error of determination, that is, a low speed results in a significantly long pulse interval and causes the determination error. If the speed V is greater than the reference, the block 108 is followed by a block 110 where $\Delta t_{max}$ is derived on the basis of the above-noted equation 1. It is also appropriate that $\Delta t_{max}$ is given by adding a value $\Delta T$ to the previous pulse interval $t_{n-1}$, i.e., by the equation $\Delta t_{max} = \Delta t_{n-1} + \Delta T$. The value $\Delta T$ is a constant or is derived as a function of the wheel speed. Exit from the operations block 110 is to a decision block 112, so that $\Delta t_{max}$ is compared with the time T elapsed from the start of the timer. If $T > \Delta t_{max}$, a block 114 follows to determine the abnormality of the rotational speed sensor 5. If $T < \Delta t_{max}$, this routine is terminated. In the next execution of this routine, the absence of the pulse causes an exit from the decision block 100 to the block 112.

Figure 4:
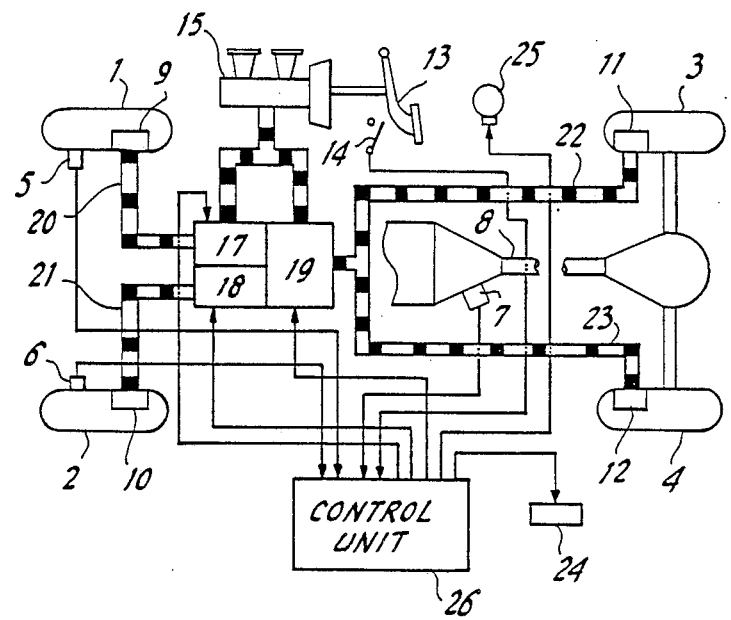
FIG. 4 is an illustration of an anti-skid control system incorporating the apparatus for the detection of abnormality of a speed sensor according to the present invention.

FIG. 4 is an illustration of an anti-skid control system incorporating the system for the detection of abnormality of a speed sensor according to the present invention.

Front wheel sensors 5 and 6, which are of the electromagnetic pick-up type or the photoelectric type, are respectively provided on front-right and front-left wheels 1 and 2, each producing a signal indicative of a wheel speed and the produced signal being supplied to a control unit 26, and a rear wheel speed sensor 7 is located on a propeller shaft 8 that drives rear-right and rear-left wheels 3 and 4, the rear wheel speed sensor 7 producing a signal indicative of an average rear wheel speed and the produced signal being also supplied to the control unit 26. Pressure control signals are supplied from the control unit 26 to solenoid-operated actuators 17, 18 and 19, which respectively supply the hydraulic pressure from a hydraulic pressure generating cylinder 15 through passages 20, 21, 22 and 23 to hydraulic brake devices 9, 10, 11 and 12 under the control of the control unit 26, so that the braking force for each of the wheels is controlled. A stop switch 14 is located in proximity to a braking pedal 13 and generate braking pedal ON or OFF signal indicative of the presence or absence of the braking operation, and the signal from the stop switch 14 is supplied to the control unit 26. Illustrated at numeral 24 is a main relay which causes a power supply (not shown) to switch into connection to the solenoid of each the actuators 17, 18, 19 in accordance with a control signal from the control unit 26. An indicator lamp 25 is provided to alert vehicle passengers when abnormality such as disconnection have occurred in the circuits to the actuator's solenoids and the stop switch 14. The control unit 26 is responsive to the signals from the wheel speed sensors 5, 6, 7 and the stop switch 14, and performs the process for anti-skid control and the control of the main relay 24 and the indicator lamp 25.

Figure 5:
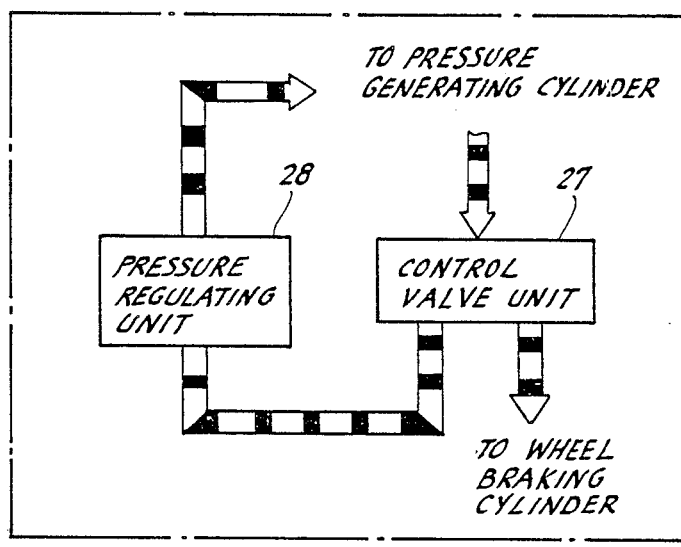
FIG. 5 is an illustration of the detail of the actuators of FIG. 4.

As illustrated in FIG. 5, each of the solenoid-operated actuators 17-19 comprises a control valve unit 27 for switching the braking hydraulic pressure into pressure-increasing mode, pressure-decreasing mode or pressure-maintaining mode, and a pressure-regulating unit 28 including a reservoir and a pump whereby the braking liquid is returned to the side of the hydraulic pressure generating cylinder 15 after temporarily stored on decrease of the hydraulic pressure. The hydraulic pressure supplied from the each the actuators is delivered through the passages 20, 21, 22, 23 to the wheel braking cylinder of each of the hydraulic brake devices 9-12.

Figure 6:
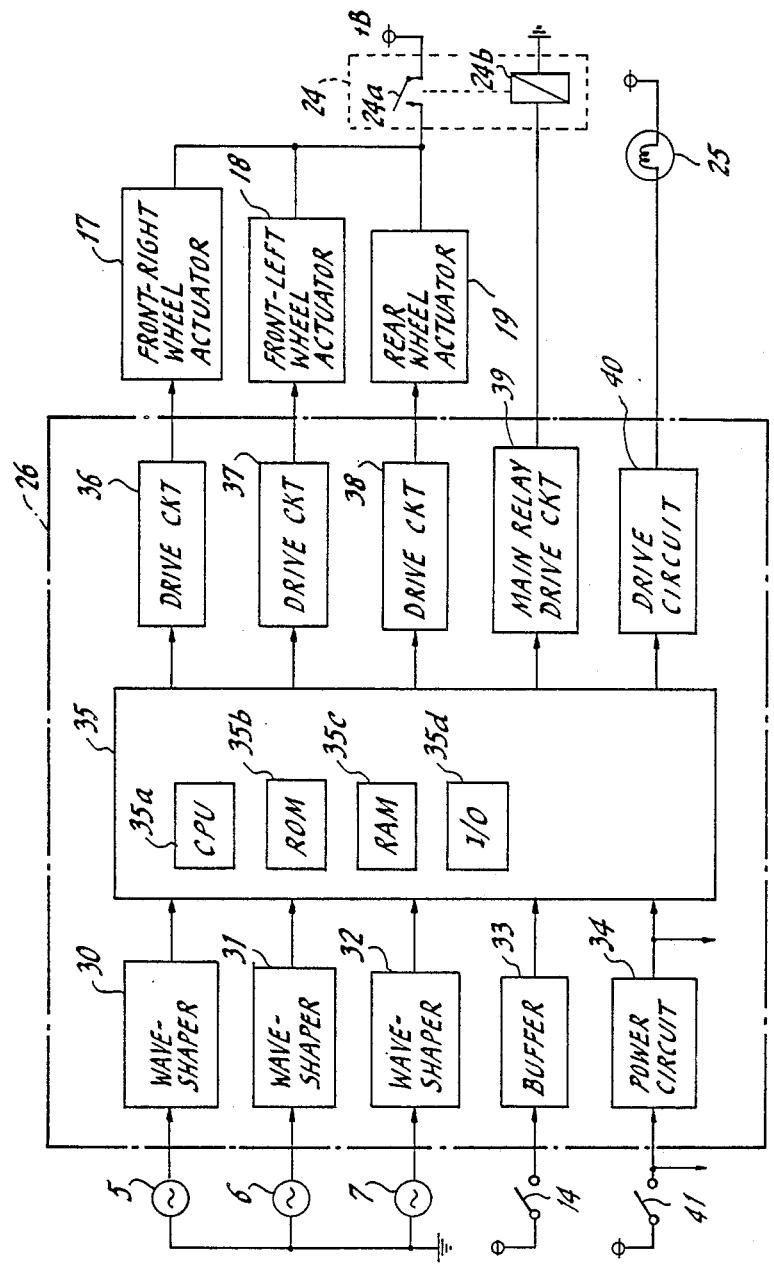
FIG. 6 is an illustration of the detail of the control unit of FIG. 4.

FIG. 6 is an illustration of the detail of the control unit 26 of FIG. 4, in which parts corresponding to those of FIG. 1 are marked with the same numerals and characters.

Wheel speed signals from the sensors 5, 6 and 7 are shaped to rectangular pulses by waveshaping amplifier circuits 30, 31 and 32, and a stop signal from the stop switch 14 is fed to a buffer circuit 33. A microcomputer 35, which is powered by the constant voltage of a power circuit 34 in response to an ignition switch 41, includes a central processing unit (CPU) 35a that receives these signals through an input/output port (I/O) 35d to perform operations according to programmed instructions stored in a read-only memory (ROM) 35b. A random access memory (RAM) 35c is used for storing temporary data during the process of input data. Brake control signals from the microcomputer 35 are fed through drive circuits 36, 37, 38 to the solenoid-operated actuators 17, 18, 19, respectively, which are connected in circuit with the relay contact 24a of a main relay 24 which is normally opened. The relay contact 24a is closed in response to the energization of a coil 24b of the main relay 24 performed by a main relay drive circuit 39 under control of the microcomputer 35. An indicator lamp drive circuit 40 energizes an indicator lamp 25 under control of the microcomputer 35.

FIG. 7 is a graphic illustration useful for describing the functions of the present invention.

Let it be assumed that a vehicle is driven with a constant speed and then the running speed is decreased in response to the braking pedal 13 being depressed at the time t1. The speed-decreasing condition is detected by the wheel speed sensors 5-7 and the control unit 26 computes a speed-decreasing ratio or a slip ratio on the basis of the wheel speed signals. When the speed-decreasing ratio or slip ratio exceeds a predetermined level, the control unit 26 performs anti-skid control to obtain the optimal slip ratio by controlling the braking hydraulic pressure applied through the actuators 17-19 to the hydraulic brake devices 9-12.

Furthermore, let it be assumed that the wheel speed sensors 5-7 have become abnormal at the time t2 as a result of disconnection or the like. Due to this abnormality the wheel speed signal becomes zero level and the wheel acceleration value is rapidly decreased and assumes a negative value. In response to the speed and acceleration value thus obtained, the control unit 26 switches the actuators 17-19 into the pressure-decreasing mode, and therefore the hydraulic pressures in the hydraulic brake devices 9-12 are respectively reduced as indicated by a dashed line.

However, Due to the operation of FIG. 3 according to the present invention, the abnormality of the wheel speed sensor can be quickly detected based on the absence of wheel speed signal within a longest estimation time period $\Delta t_{max}$. Therefore, in response to the detection of abnormality it is possible to speedily perform a fail-safe control, whereby, for example, the anti-skid control is stopped and the hydraulic pressure is directly from the hydraulic pressure generating cylinder 15 to the hydraulic brake devices 9-12, resulting in the prevention of rapid decrease of the hydraulic pressure in each the hydraulic brake device and increase in safety of the vehicle.

It should be understood that the forgoing relates to only preferred embodiments of the invention, and that it is intended to cover all changes and modifications of the embodiments of the invention herein used for purposes of the disclosure, which do not constitute departures from the spirit and scope of the invention.

What is claimed is:

1. An apparatus for detecting an abnormality in a rotational speed sensor which monitors a rotational speed of a body of revolution and produced pulse signals indicative thereof, comprising:
    pulse decision means for determining whether a pulse signal from said rotational speed sensor is present or not;
    means, responsive to the pulse signals from said rotational speed sensor when said pulse decision means determines that said pulse signal from said rotational speed sensor is present, for measuring an interval between successive pulse signals;
    means for determining a rotational speed of said body on the basis of an interval measured by said interval measuring means;
    means for setting a time period on the basis of the measured interval;
    means for measuring a time elapsed after generation of one of said signals by said rotational speed sensor;
    means, responsive to said pulse decision means determining that said pulse signal of said rotational speed sensor is not present, for determining whether the time measured by said time measuring means exceeds the time set by said setting means; and
    means for determining said rotational speed sensor to be abnormal when the measured time exceeds the set time while said pulse decision means determines no generation of said pulse signal by said rotational speed sensor.

2. An apparatus as claimed in claim 1, further comprising means for determining whether the rotational speed calculated by said speed determining means exceeds a predetermined reference speed and for initiating said setting means to set said time period when exceeding said predetermined reference speed.

3. An apparatus as in claim 1 wherein said measuring means includes means for energizing a timer each time said pulse decision means indicates that a pulse signal is present.

4. An apparatus as in claim 1 further comprising said rotational speed sensor which includes a disk-like member having projections at a circumference thereof, each said pulse produced by a passage of one of said projections.

5. An apparatus for detecting an abnormality in a rotational speed sensor which monitors a rotational speed of a body of revolution and produced pulse signals indicative thereof, comprising:
    pulse decision means for determining whether a pulse signal from said rotational speed sensor is present or not;
    means, responsive to the pulse signals from said rotational speed sensor when said pulse decision means determines that said pulse signal from said rotational speed sensor is present, for successively measuring an interval between successive pulse signals therefrom;
    means for determining a rotational speed of said body on the basis of an interval measured by said interval measuring means;
    means, responsive to said interval measuring means, for setting a time period of a longest possible length which can be expected, by adding a value to said measured interval obtained on the basis of a pulse signal currently generated from said rotational speed sensor;
    means for measuring a time elapsed after said currently generated signal is produced by said rotational speed sensor;
    means, responsive to said pulse decision means determining that said pulse signal from said rotational speed sensor is not present, for determining whether the time measured by said time measuring means exceeds said time period set by said setting means; and
    means for determining said rotational speed sensor to be abnormal when the measured time exceeds the set time period of a longest possible length and when said pulse decision means determines that said pulse signal of said rotational speed sensor is not present.

6. An apparatus as claimed in claim 5, wherein said setting means includes means for determining said value added to the measured interval as a function of a rotational speed of said body or revolution obtained on the basis of the measured interval.

7. An apparatus as claimed in claim 5, further comprising means for checking whether the rotational speed calculated by said speed determining means exceeds a predetermined reference speed and for initiating said setting means to set said time period of a longest possible length when exceeding said predetermined reference speed.

8. An apparatus for detecting an abnormality in a rotational speed sensor which monitors a rotational speed of a body of revolution and produces pulse signals indicative thereof, comprising:
    pulse decision means for determining whether a pulse signal from said rotational speed sensor is present or not;
    means, responsive to the pulse signals from said rotational speed sensor when said pulse decision means determines that said pulse signal from said rotational speed sensor is present, for successively measuring an interval between successive pulse signals from said rotational speed sensor;

means for calculating a rotational speed of said body on the basis of an interval measured by said interval measuring means;

means, responsive to said interval measuring means, for setting a time period of a longest possible length which can be expected, on the basis of a previously measured interval and a value indicative of an inertial force of said body of revolution developed by a braking operation thereof;

means for measuring a time elapsing after a currently generated signal is produced by said rotational speed sensor;

means, responsive to said pulse decision means determining that said pulse signal of said rotational speed sensor is not present for determining whether the time measured by said time measuring means exceeds said time period set by said setting means until a subsequent signal is generated by said rotational speed sensor; and means for determining said rotational speed sensor to be abnormal when the measured time exceeds said time period of a longest possible length and when said pulse decision means determines said pulse signal of said rotational speed sensor is not present.

9. An apparatus as claimed in claim 8, wherein said inertial force indicating value is obtained on the basis of the rate of speed variation of said body of revolution.

10. An apparatus as claimed in claim 8, wherein said inertial force indicating value corresponds to a maximum inertial force which can be obtained on the braking operations.

11. An apparatus as claimed in claim 8, further comprising means for determining whether the rotational speed calculated by said speed-calculating means exceeds a predetermined reference speed and means for initiating said setting means to set said time period of a longest possible length when exceeding said predetermined reference speed.

12. A method for detecting an abnormality in a rotational speed sensor which senses a rotational speed of a body of revolution and produced pulse signals indicative thereof, said method comprising the steps of:

determining whether a pulse signal from said rotational speed sensor is present;

measuring an elapsing time beginning when said rotational speed sensor generates the pulse signal;

measuring responsive to a pulse signal being present in said determining step, an interval between successive pulse signals;

determining a rotational speed of said body of revolution as a function of the measured interval;

determining whether the determined rotational speed exceeds a predetermined value;

setting a time period on the basis of the measured interval when the determined rotational speed exceeds the predetermined value;

determining whether the time measured by said elapsed time measuring step exceeds said set time when said pulse signal from said rotational speed sensor is not present as determined in said determining a pulse signal step; and determining said rotational speed sensor to be abnormal when the measured time exceeds the set time under a condition of no generation of the pulse signal from said rotational speed sensor.

13. A method as claimed in claim 12, further comprising the steps of determining whether the rotational speed derived by said speed-deriving means exceeds a predetermined reference speed, and initiating said setting step to set said time period when exceeding said predetermined reference speed.

14. A braking system with an anti-skid control device for a motor vehicle, comprising:

a hydraulic pressure generating cylinder operatively coupled to a brake pedal of said motor vehicle;

a wheel braking cylinder responsive to a hydraulic pressure generated by said hydraulic pressure generating cylinder for braking a wheel of said motor vehicle, said wheel braking cylinder being coupled through a hydraulic pressure passage, a directional control valve and a hydraulic pressure control device to said hydraulic pressure generating cylinder;

sensor means for sensing a speed of said wheel by sensing wheel rotation signals and generating a pulse signal each time a wheel rotation signals is sensed;

means for determining a sensed wheel speed from said pulse signals and comparing said sensed wheel speed with a reference value;

pulse decision means for determining whether a pulse signal from said rotational speed sensor is present or not;

first control means for generating a first control signal for performing anti-skid control by controlling said hydraulic pressure control device in accordance with the result of the comparison;

second control means responsive to the wheel speed signal for (1) measuring an interval between successive ones of said pulse signals and determining a set time period on the basis of the currently measured interval and a value indicative of the magnitude of the inertial force developed on the braking operation of said wheel, (2) measuring a time elapsing after a currently generated wheel rotation signal, (3) determining if the measured time exceeds the set time when said pulse decision means determines that said pulse signal is not present, and (4) determining said sensor means to be abnormal when the measured time exceeds the set time while the pulse decision means determines that no pulse signal is present and generating a second control signal indicative of the abnormality; and third control means, responsive to said second control signal, for performing a fail-safe control by controlling said directional control valve.

15. A braking system as claimed in claim 14, wherein said second control means estimates the time period on the basis of the previous measured interval and a predetermined value corresponding to the maximum inertial force of said wheel which can be obtained on the braking operation thereof.

16. A braking system as claimed in claim 14, wherein said second control means also includes means for calculating a rotational speed of said wheel on the basis of the measured interval and for determining a time when the calculated rotational speed exceeds a predetermined reference speed.

* * * * *